(12) United States Patent
Gungabeesoon

(10) Patent No.: US 7,007,278 B2
(45) Date of Patent: Feb. 28, 2006

(54) ACCESSING LEGACY APPLICATIONS FROM THE INTERNET

(75) Inventor: Satish Gungabeesoon, Markham (CA)

(73) Assignee: International Business Machines Corporation, Armonk, NY (US)

(*) Notice: Subject to any disclaimer, the term of this patent is extended or adjusted under 35 U.S.C. 154(b) by 764 days.

(21) Appl. No.: 09/828,562

(22) Filed: Apr. 6, 2001

(65) Prior Publication Data

US 2002/0019884 A1 Feb. 14, 2002

(30) Foreign Application Priority Data

Aug. 14, 2000 (CA) .................... 2316003

(51) Int. Cl.
*G06F 15/163* (2006.01)
(52) U.S. Cl. ...................... 719/311; 709/203
(58) Field of Classification Search ................ 719/311; 703/2; 709/203
See application file for complete search history.

(56) References Cited

U.S. PATENT DOCUMENTS

| | | | | |
|---|---|---|---|---|
| 5,754,830 A | | 5/1998 | Butts et al. .................. | 395/500 |
| 6,621,505 B1 * | | 9/2003 | Beauchamp et al. ........ | 345/764 |
| 6,728,769 B1 * | | 4/2004 | Hoffmann .................... | 709/225 |

OTHER PUBLICATIONS

Zurick, "Design Pattern", 1997, sections Adapter, Bridge, and Mediator.*
IBM Corp.: "IBM WebSphere Host Publisher, Administrator's and User's Guide—Version 2.2", WebSphere Host Publicher Documentation, 'Online' Jul. 2000, Retrieved from the Internet , URL: ftp://ftp.software.ibm.com/software/webserver/hostpublisher/publications/hp22_ guide.pdf; p. 1, line 23; p. 2, last line p. 4, line 26, p. 5, last line, p. 21, line 28, p. 25, line 23, p. 29, line 15, p. 32, last line, p. 48, line 16, p. 49, line 22.
Tibbetts J et al: "Legacy Applications on the web", vol. 9, No. 12, Dec. 1, 1996, p. 18-24.
Krueger J, Degiglio M: IBM Host Integration solution Products: Extending AS/400 Applications for e-business: p. 7, right-hand column, line 14, p. 8, right-hand column, line 11. Rerieved from the Internet: ftp://ftp.software.ibm.com/software/webserver/hostintegration/library/hiandas400.pdf.
IBM Corp.: IBM WebSphere Host Publisher Programmer's Guide and Reference—Version 1, /Release 2. Retrieved from the Internet: ftp://ftp.software.ibm.com/software/webserver/hostpublisher/publications/hp22_progguid.pdf, p. 3, line 10; p. 7, line 25; figure 1, p. 9; line 1; p. 12, line 2, p. 13, line 1-line 8.

* cited by examiner

*Primary Examiner*—W. Thompson
*Assistant Examiner*—Phuong N. Hoang
(74) *Attorney, Agent, or Firm*—A. Bruce Clay, Esq.; Hoffman, Warnick & D'Alessandro, LLC

(57) ABSTRACT

Interactive legacy applications can be run from a network, such as the Internet, without requiring any code changes in the application. Typically, legacy applications are critical to a business, are self-contained on the computer, have mixed business and user interface logic, and were written before distributed computing emerged. Separating business logic from user interface logic as required by web application architectures is not practicable in the case of legacy applications. A client has a network user agent which can access a network server connected to the computer. When an application is invoked from the network user agent, a runtime data redirector intercepts the application's raw data and sends the data to the network server which then serves the data across the network to the network user agent. Input data from the user entered through the network user agent are sent back to the application via the same runtime intercept.

1 Claim, 6 Drawing Sheets

ACCESSING LEGACY APPLICATIONS FROM THE INTERNET

TECHNICAL FIELD

This application relates generally to the field of computer software applications and more particularly relates to accessing legacy application programs over a computer network, such as the Internet.

BACKGROUND OF THE INVENTION

Like everything else, computer use has changed over the years. In the early days, large mainframe computers dominated the industry until the advent of the personal standalone computer. Now many businesses and homes have at least one personal standalone computer, a PC. A new paradigm of computing, however, has emerged: network-centric computing or distributed computing in which at least two, but more likely many more computers, called clients and servers, are interconnected through a network wherein the software applications used by a client resides on a server. Thus, a server may provide the application or client program or databases used by an end user or by a number of other servers and clients over a network.

In many instances and increasingly more so, the network connecting clients and servers is the Internet. The Internet refers to a collection of interconnected computer networks that use the Internet protocol, e.g., TCP/IP, UDP, etc. Software applications are written in a programming language independent of the operating system of either the server or the client to access and use a myriad of applications on the Internet. Languages that describe data over the Internet, moreover, include variations of extensible mark-up languages (XML), such as hypertext mark-up language (HTML), wireless mark-up language (WML), etc. The world wide web refers to a software management scheme which accesses the Internet with various user agents using hypertext links.

Distributed computing has fundamentally changed the methodology of software developers in writing code for these applications. Rather than writing one massive self-contained application having thousands or millions of lines of code, software developers select and weave together smaller portions of code, called components, each associated with a particular function that can be reused across multiple applications, all on the world wide web. Components are standard software that can be pulled off a server and incorporated into new applications by software developers. For example, a calendar component may be used in several applications such as a scheduling application, a presentation application, and/or a data base application to calculate employee's vacation and pay, etc. Current industry architectures for Internet and world wide web applications, moreover, require that business logic be separated from presentation logic such that the business logic is solely responsible for providing business data while the presentation logic is solely responsible for driving presentation or the user interface.

The massive self-contained applications having thousands or millions of lines of code, however, may still be very important to businesses and organizations. Indeed, some self-contained programs may contain a business's entire inventory/client list/database or all of the above. The term "legacy applications" refers to old applications which remain in operation with a business or organization but were developed before the advent of distributed computing and structured programming and its techniques of modularity, coupling, cohesion, etc. Legacy applications written as one large self-contained program do not accommodate change easily. These legacy applications, moreover, are often so critical to the business that these businesses face difficult decisions about the future of such applications and the ability to exploit new network and Internet technologies for remote and distributed access to these critical applications. Interactive legacy applications that have mixed business and presentation logic must be restructured and/or reengineered to be enabled as web applications. Separating the business logic from the user interface logic, however, is not always practicable to deploy applications onto the web with minimal intervention and testing.

Other solutions to implement legacy applications on the Internet and world wide web may use a screen-scraping technique which converts legacy display data streams at runtime to a web-based language, such as HTML, or other language. The HTML converted screens are then displayed on a browser. Converting legacy display data stream at runtime, however, is slow, compromises performance of the application, and does not give the user the capability of integrating or bridging legacy applications seamlessly with new web or other network applications. Nor does mere conversion of legacy data provide the capability to enhance the effectiveness of the user interface of the application when the application runs on the Internet.

There is thus a need in the industry to access legacy applications from the Internet, the world wide web, or other computer communication networks without having to restructure the application or make code changes to the programs.

There is a further need in the industry to seamlessly interweave legacy applications with other network applications.

SUMMARY OF THE INVENTION

These needs and others that will become apparent to one skilled in the art are satisfied by a method to execute a computer application installed on a computer, comprising the steps of creating a servlet instance in a server connected to the computer on a first network; running the application on the computer to generate dynamic data; intercepting and redirecting the dynamic data to a network publishing component on the computer; transmitting dynamic data from the network publishing component to the servlet instance; and creating data objects and populating the data objects with the dynamic data in the server. The method may further comprise requesting the application from a client connected to the server over a second network; updating at least one network page with the dynamic data; and transmitting the updated network pages to the client.

The first network may be the Internet. The first network may also be selected from the group consisting of: an internal network, an Intranet, a LAN, a WAN, an internal bus, a wireless network. Similarly the second network may be the Internet; or may be selected from the group consisting of: an internal network, an Intranet, a LAN, a WAN, an internal bus, a wireless network. The computer may contain the network server.

The method may further comprise converting the display files of the application to network pages capable of displaying dynamic data. The network pages may be based on a XML language, such as HTML and/or WML. The network pages may be JavaServerPages. The network pages, moreover, may be stored on the server.

The method of the invention may further comprise creating an I/O buffer for the dynamic data in the computer. The method may also comprise the steps of creating a first endpoint connection between the servlet instance and the network publishing component; the endpoint connection may be a socket, or a data queue object, or a message queue.

It is also envisioned that the invention comprises a program product for use in a computer network for executing an application stored on a computer from a client, the computer program product comprising a signal-bearing medium carrying thereon: an application invoker to start and run an application in its native environment on the computer from a client; a plurality of network user interface pages to display the application's input/output data on the client; a data redirector to redirect the application's input/output data to network user-interface pages; a plurality of data objects corresponding to the network user interface pages to receive the application's input/output data; a servlet instance to dynamically update the network user interface pages with the application's input/output data; and a network user agent to display the updated network user-interface pages on the client. The program product may further comprise a screen definition converter to convert the input/output screen definitions of the application to the network user-interface pages.

The invention may also be considered a computer system for executing an application, comprising: a central processing unit; a main memory connected to the central processing unit with a communication bus; a data storage unit connected to a data storage interface which is connected to the communication bus; at least one input/output device connected to the communication bus and connected to a network interface to an external computer network, an application stored in the main memory and capable of executing on the central processing unit; a network publishing component; a data redirector to redirect the application's dynamic data to the network publishing component; and an I/O buffer to store the redirected dynamic data.

Yet, in another embodiment, the invention may be considered a network server for accessing an application stored and executing on a computer, comprising: a central processing unit; a network interface to connect to at least one client over a network; a servlet instance to receive a request from the at least one client to access the application and transmit the request to the computer; a server endpoint connection for transmitting and receiving real-time data to and from the computer on which the application is executing; and a plurality of data objects to be populated with the real-time data wherein the servlet receives the real-time data from the application and populates the data objects with the real-time data. The network server may further comprise a plurality of network display pages, each of the network display pages unique to each input/output screen definition of the application wherein the servlet updates the network display pages for transmission to the client over the network.

The invention may also be viewed as a method for executing a computer application installed on a computer, comprising the steps of: converting a plurality of display files of the application to a plurality of XML-based network pages capable of displaying the application's dynamic data; creating a servlet instance in a server connected to the computer on a network; requesting the application from a client connected to a server over the Internet; running the application on the computer in its native environment; creating an I/O buffer in the computer for the application's dynamic data; creating an endpoint connection between the servlet instance and a network publishing component on the computer; transmitting the dynamic data back and forth from the client to the application through the servlet instance; creating data objects and populating the data objects with the dynamic data; updating at least one network page using the data objects; transmitting the updated network pages to the client over the Internet; and transmitting network pages having responsive data from the client to server for transmission as input data to the application.

Yet, another aspect of the invention is a method of interacting with a computer application, comprising: executing a legacy computer application in its native environment; redirecting I/O requests from and responses to the legacy computer application from a client over the Internet without introducing changes to the code of the legacy computer application.

DETAILED DESCRIPTION OF THE INVENTION

Figure 1:
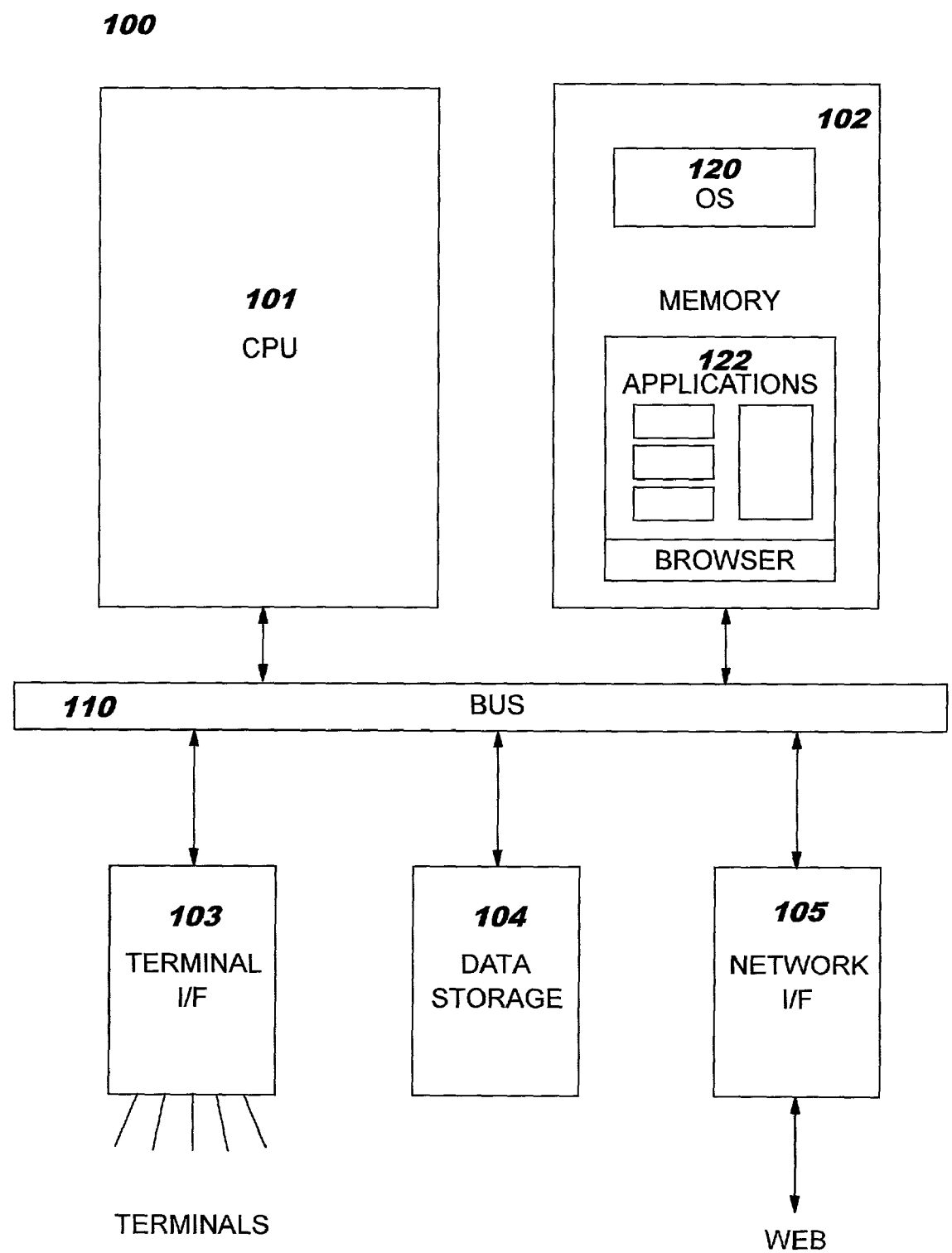
FIG. 1 is a high-level block diagram of a computer system capable of implementing the preferred embodiment of the invention.

Referring to the Drawing, wherein like numbers denote like parts throughout the several views, FIG. 1 shows a high-level block diagram of a computer system 100, consistent with an embodiment of the invention. Computer system 100 may comprise central processing unit (CPU) 101, main memory 102, terminal interface 103, data storage 104, and a network, e.g., Internet, interface 105. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity but it is well known that memory is often arranged in a hierarchy of caches and other memory devices. Operating system 120 and applications 122 reside in memory 102. Operating system 120 provides, inter alia, functions such as device interfaces, management of memory pages, management of multiple tasks, etc. as is known in the art. Applications 122 may include legacy applications and if it includes a server software application, network interface 105 may interact with the server software application 122 to enable computer system 100 to be a network server.

Terminal interface 103 may support the attachment of single or multiple terminals and may be implemented as one or multiple electronic circuit cards or other units. Data storage 104 preferably comprises one or more rotating magnetic hard disk drive units, although other types of data storage could be used. Network interface 105 provides a physical connection for transmission of data to and from a network. In the preferred embodiment the network is the Internet but the network could also be any smaller self-contained network such as an Intranet, a WAN, a LAN, or other internal or external network using, e.g., telephone transmissions lines, satellites, fiber optics, T1 lines, etc. and any various available technologies. Communications bus 110 supports transfer of data, commands and other information between different devices; while shown in simplified form as a single bus, it is typically structured as multiple buses; and may be arranged in a hierarchical form.

The computer system shown in FIG. 1 is intended to be a simplified representation, it being understood that many variations in system configuration are possible in addition to those specifically mentioned here. While system 100 could conceivably be a personal computer system, the computer 100 may also be a larger computer system such as an IBM Enterprise System or an IBM AS/400 system. While a particular hardware configuration is described herein along with various alternatives, the methods described could in general be practiced using any hardware configuration that allows access to legacy applications across a computer network from a client. CPU 101 is suitably programmed to carry out the preferred embodiment by having the legacy application and a network interface that can be used by other connected computers to access that legacy application.

Computer system 100 and its components are shown and described in FIG. 1 as a more or less single, self-contained computer system. It is alternatively possible to use multiple computer systems, particularly multiple systems which share a single large database, each having a specialized task. For example, one or more computer systems 100 could be dedicated to one or more legacy applications accessing a database, while one or more other computer systems 100 could be dedicated to servicing requests received from clients or accessing the Internet. References herein to a computer should be understood to include either a single computer or a collection of computer systems which provides access to a legacy application and to a network by which to connect to a client system.

Figure 2:
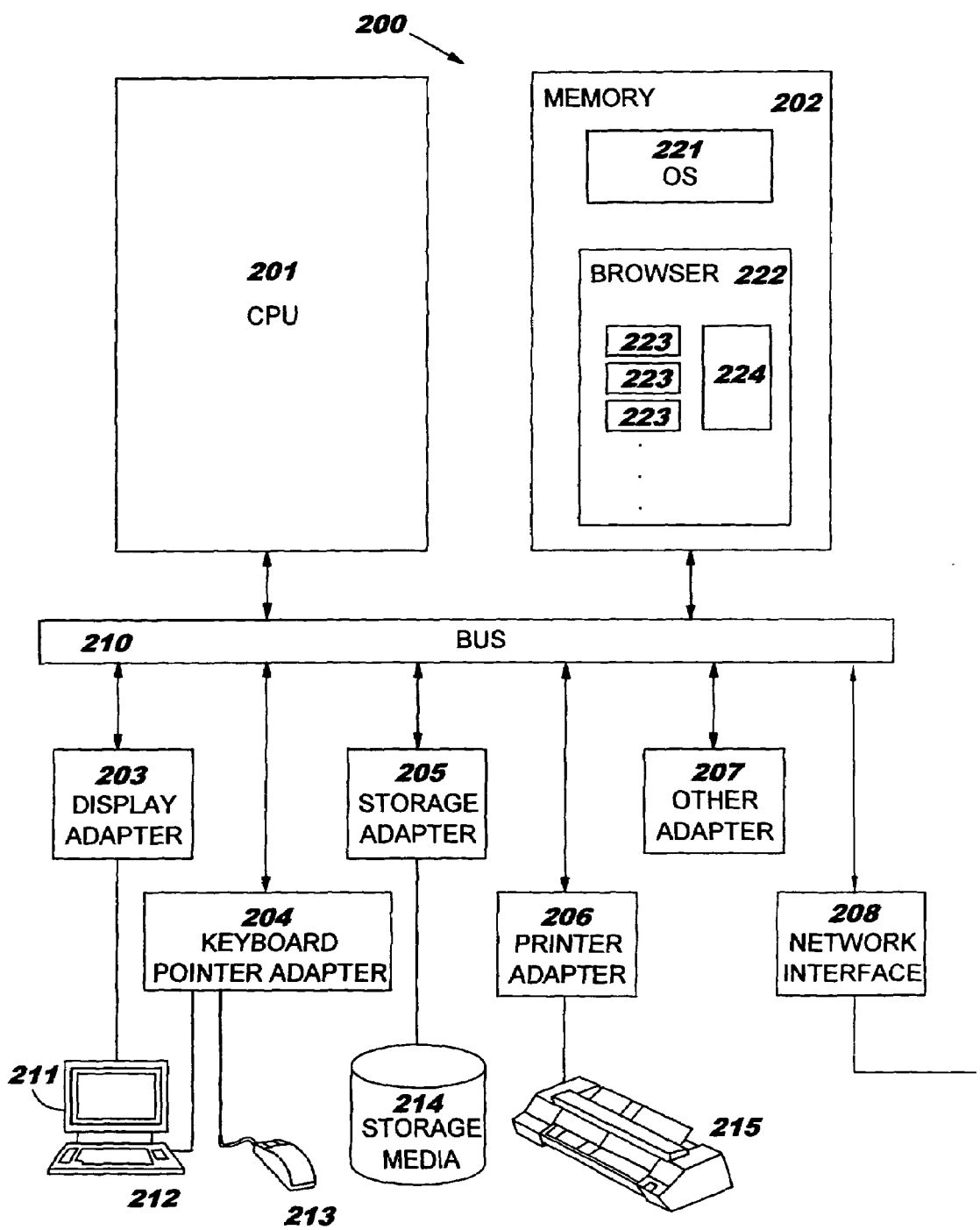
FIG. 2 is a simplified block diagram of a server system which may access legacy applications stored on the computer system in accordance with principles of the invention.

FIG. 2 is an example of a network server 200 which may access a legacy application stored on the computer 100. Network server 200 may be a computer system including a CPU 201, main memory 202, various device adapters and interfaces 203–208, and communications bus 210. CPU 201 is a general-purpose programmable processor, executing instructions stored in memory 202; while a single CPU is shown in FIG. 2, it should be understood that computer systems having multiple CPUs could be used. Memory 202 is a random-access semiconductor memory for storing data and programs; memory is shown conceptually as a single monolithic entity, it being understood that memory 202 is often arranged in a hierarchy of caches and other memory devices. Communication bus 210 supports transfer of data, commands and other information between different devices; while shown in simplified form as a single bus, it may be structured as multiple buses, and may be arranged in a hierarchical form. Display adapter 203 supports video display 211, which may be a cathode-ray tube display, a flat panel display, or a touch panel, although other display technologies may be used. Keyboard/pointer adapter 204 supports keyboard 212 and pointing device 213, depicted as a mouse, it being understood that other forms of input devices could be used. Storage adapter 205 supports one or more data storage devices 214, which may be rotating magnetic hard disk drives or CD-ROM drives, although other data storage devices could be used. Printer adapter 206 supports printer 215. Adapter 207 may support any of a variety of additional devices, such as audio devices, etc. Network interface 208 provides a physical interface to a network, such as the Internet. This interface may comprise a modem connected to a telephone line through which an Internet access provider or on-line service provider is reached, but increasingly other higher bandwidth interfaces are implemented. For example, network server 200 may be connected to another network server via a local area network using an Ethernet, Token Ring, or other protocol, the second network server in turn being connected to the Internet. Alternatively, network interface 208 may be provided through cable television, fiber optics, satellites, wireless, or other connections. The representation of FIG. 2 is intended as an exemplary simplified representation of a high-end server, it being understood that in other network servers 200 many variations in system configuration are possible in addition to those mentioned here. Network server 200 and computer 100 may be merged into the same system if computer system 100 has as one of its applications 122 a server software application in which case the network between the network server 200 and the computer 100 would be an internal communications bus.

Figure 3:
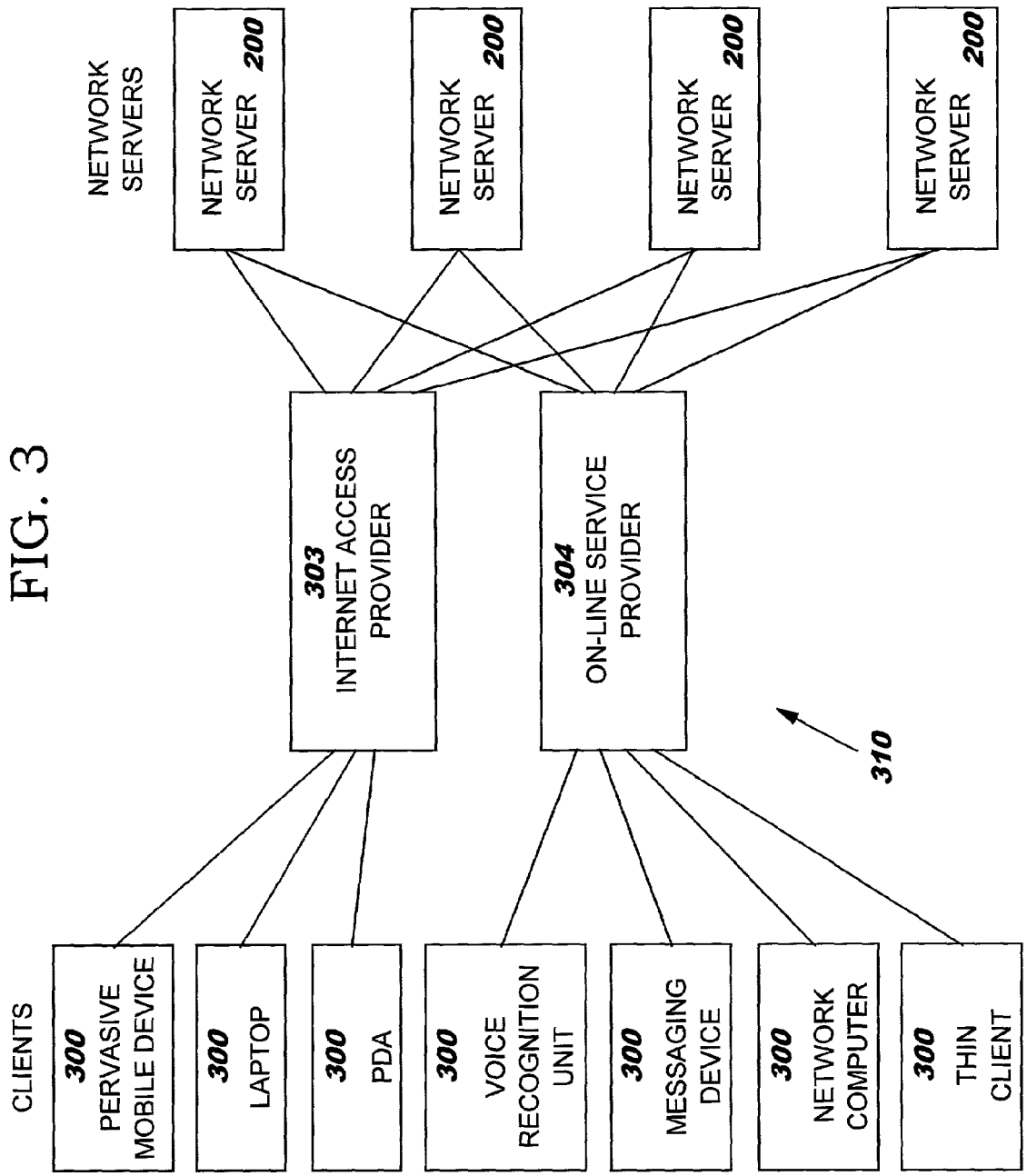
FIG. 3 is a simplified representation of a computer network of clients and servers capable of taking advantage of the invention.

With reference to FIG. 3, each client system 300 is a device separate from computer 100 that can access legacy applications which reside and run on the computer 100. Client system may be a personal computer system or a larger computer system such as a server, or a smaller computer system, such as notebook or laptop computer. Finally, client system 300 need not be a computer at all, but preferably is a simpler appliance-like client device with less memory such as a network terminal, a thin client, a terminal-like devices, a voice response unit, etc. The convergence of computing, telecommunications and consumer electronics is causing a tremendous growth in the number and variety of pervasive mobile devices as clients 300. This mobile architecture enables the multitude of clients 300 including laptops, sub-notebooks, handheld computers, such as personal digital assistants and companion devices, and mobile appliances, such as smartphones, pages, simple messaging devices and wearable devices. Thus when the client system 300 is a mobile device, a display adapter and network interface has a network user agent and supports a variety of multi-modal interfaces including traditional keyboard and mouse interfaces, small text screens, pen, touch screens, speech recognition, text-to-speech and other emerging technologies like wearable devices. A network user agent enables the use of the computer's applications on its respective client 300. It is preferably intended that client system 300 include any electronic device which may interact with a network server 200 through the network user agent, such as a web browser, to access a legacy or other applications residing on the computer system 100. Such special-purpose devices for accessing the world wide web, such as an Internet access box for a television set, or a portable wireless web accessing device, which can implement a user agent for the purpose of invoking and executing an application are also intended to be within the scope of a client system 300. The network user agent could be implemented by control circuitry through the use of logic gate, programmable logic devices, or other hardware components in lieu of a processor-based system.

As will be described in detail below, aspects of the preferred embodiment pertain to specific method steps implementable on a computer 100 or a network server 200. In an alternative embodiment, the invention may be implemented as a computer program-product for use with either or both a network server 200 and a client 300. The programs defining the functions of the preferred embodiment can be delivered to the computer 100 and/or to the network server 200 via a variety of signal-bearing media, which include, but are not limited to: (a) information permanently stored on non-writable storage media, e.g., read only memory devices within either computer such as CD-ROM disks readable by CD-ROM drive 214; (b) alterable information stored on writeable storage media, e.g., floppy disks within diskette drive or hard-disk drive, such as shown as 214 in FIG. 2; or (c) information conveyed to a computer by a telephone or a cable media network, including wireless communications. Such signal-bearing media, when carrying computer-readable instructions that direct the functions of the present invention, represent alternative embodiments of the present invention.

FIG. 3 is a simplified representation of a computer network. The computer network is representative of the Internet, which can be described as a known computer network based on the client-server model discussed herein. Conceptually, the Internet includes a large network of network servers 200 that are accessible by client systems 300 through a private Internet access provider 303 or an on-line service provider 304. In the preferred embodiment, each of the client systems 300 may run a respective network user agent such as a browser to access network servers 200 via the access providers. Each network server 200 may have legacy applications of their own or may be connected to other computers 100 that have legacy applications to be accessed through the Internet or other connections to the clients 300. Moreover, a legacy application need not be stored on only one computer 100; rather various tasks of a single application may be stored on more than one computer 100 to which a network server 200 is connected through the network, such as the Internet. An Internet network path to servers 200 is identified by a Universal Resource Locator (URL) having a known syntax for defining a network connection. While various relatively direct paths are shown, it will be understood that FIG. 3 is a conceptual representation only, and that a computer network such as the Internet may in fact have a far more complex structure. It is also to be understood that computer network may also be an Intranet or other internal computer network, such as a WAN, a LAN, etc. The invention is particularly useful on the Internet in its preferred embodiment, although it is not intended to be so limited.

This invention provides an environment that shields interactive legacy applications from restructuring or reengineering the applications' code by allowing such legacy applications to continue running, as-is, in their native environment while simultaneously allowing a variety of clients to access the legacy applications using a web browser or other network technology. The invention also provides the interactive legacy applications with the ability to generate the required business data and drive separate presentation artifacts as required by industry standard world wide web application architectures. What is interesting about the invention is the interaction between the "stateful" legacy applications and the "stateless" Internet transactions. Interactive legacy applications are stateful in that the application continues to execute until it comes to an I/O instruction wherein execution is suspended and the application's state is preserved in its native environment until the I/O action is completed. Internet transactions, on the other hand, use stateless protocols of, e.g., HTTP, wherein after a transaction on the Internet is completed, the connection to the Internet is broken and the state of the transaction is lost unless additional processing occurs to save that state on the network server. This invention provides a mechanism and an environment whereby the state of the legacy application is automatically preserved in its native environment while it converses with the stateless web environment. The automatic preservation of the application's state is inherent in the architecture of the invention which provides the necessary continuity required by interactive legacy applications.

Figure 4:
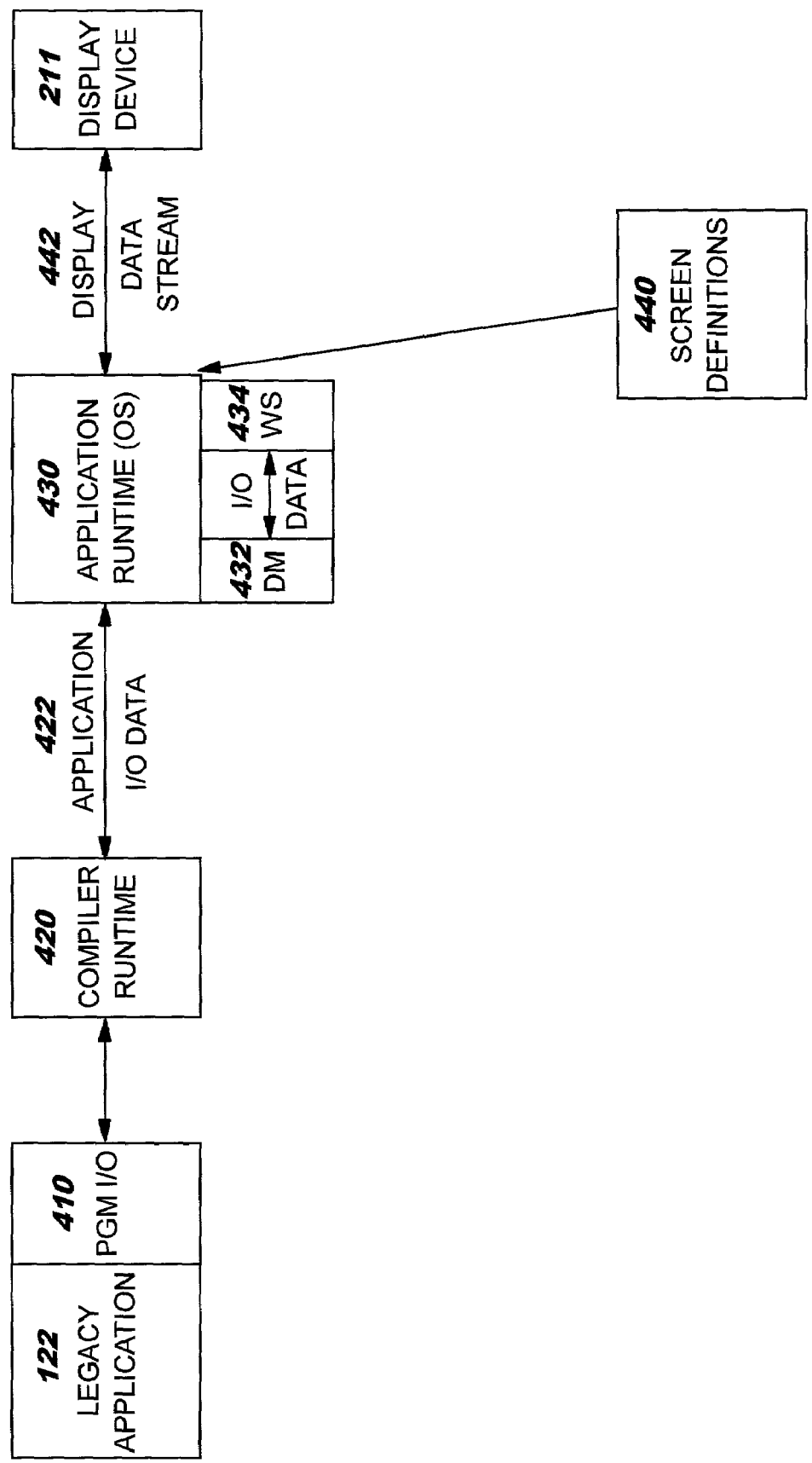
FIG. 4 is a simplified process chart and block diagram of a prior art computer legacy application environment showing the flow of data to be displayed.

With reference to FIG. 4, there is shown a simplified process chart and block diagram of a prior art computer application environment. Each legacy application 122 has data 422 to be input/output to/from the application runtime operating system 430 according to the program I/O code 410 through the compiler runtime 420. Output data 422 may be sent to the data manager code 432 which is part of the application runtime operating system 430. A workstation manager 434 or an equivalent function within the application runtime operating system 430 combines the output data 422 with corresponding display records from the applications' user interface definition files 440 to generate a data stream 442 to be displayed on a proprietary display device 211. When the data are built into the data stream and sent for display to the display device, display-formatting of application data is defined in the screen definition itself and the format code is applied to the data by the application runtime component 430 of the operating system. Prior to application runtime, these user interface definition files 440 are compiled and built into one or more display objects referenced during runtime. Input data follows the reverse path: the application runtime 430 extracts the input data from the inbound data stream, formats the data which is then submitted to the application as user input data. On some systems, the display device 211 builds only the dynamic portion, e.g., the input fields, of the screen into the inbound data stream.

Figure 5:
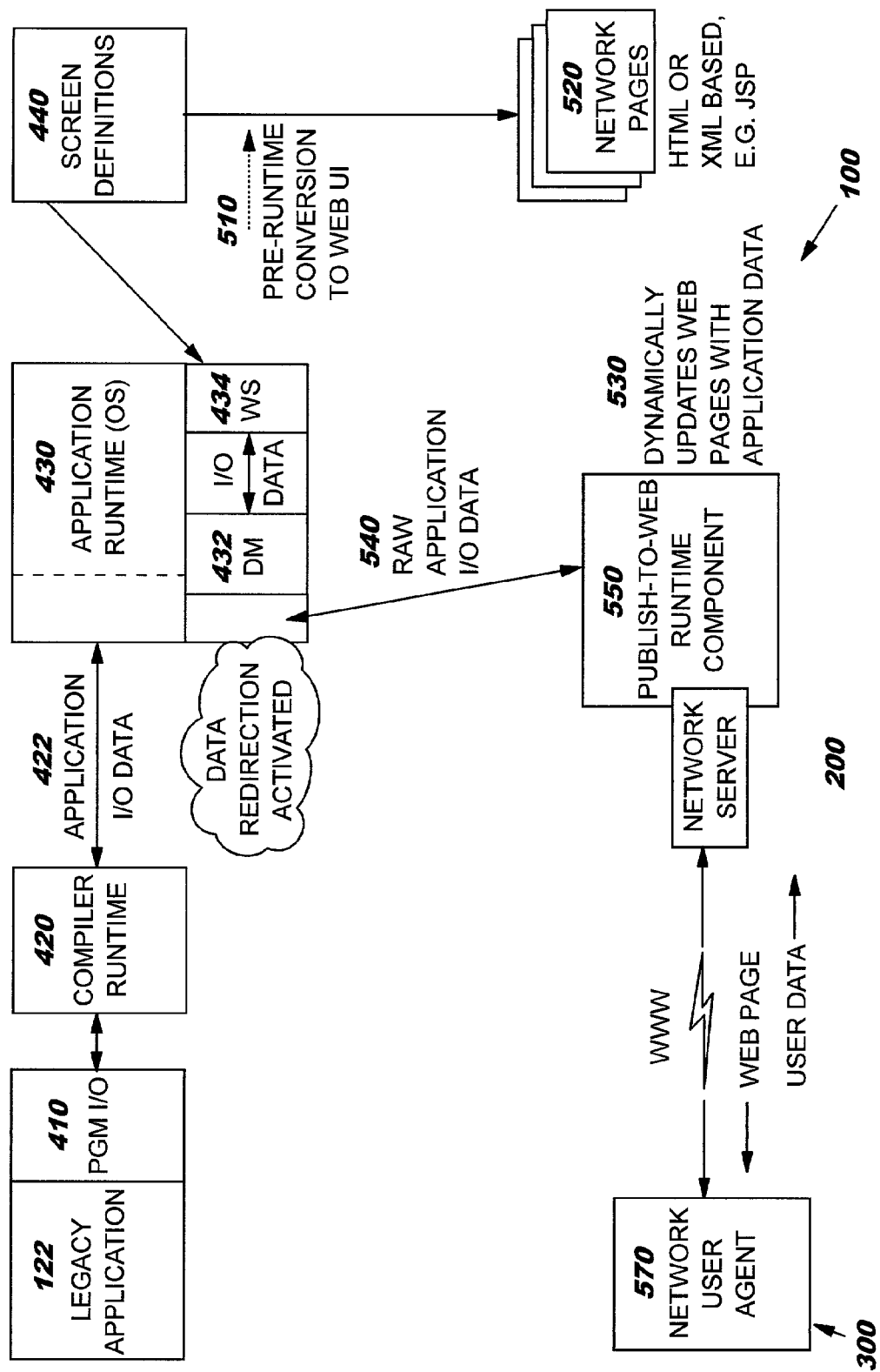
FIG. 5 is a simplified process diagram of how data is redirected to/from a network and a legacy application in accordance with principles of the invention.

FIG. 5 is a simplified process diagram of a method in accordance with principles of the invention to enable legacy applications to be used over a network, preferably the Internet using world wide web technology, although other networks and other technologies are considered to be within the scope of the invention. It is presumed that the proprietary user interface (UI) definitions of the native application screens, referred to FIG. 4 as screen definitions 440, are stored separately in screen definition files. First and even prior to runtime, the proprietary screen definitions 440 are parsed and converted at step 510 to a format that can be rendered by any pervasive computer Internet user agent 570, for example, a world wide web browser; this format preferably being based on XML, such as HTML, WML, or *ML, depending on the Internet user agent targeted to generate what is referred to as network pages. In the preferred embodiment, the user interface elements are mechanically mapped to an XML-based language that supports user interface elements.

Customization of the conversion process may be achieved in several ways and is desirable if the end-user company has well-defined rules on application presentation. The conversion process may identify any user interface design patterns used by the company thereby allowing the user to customize templates to map to these design patterns. The conversion algorithm then uses these patterns to identify the actual application screens and convert accordingly. Post-conversion modifications by the user may be possible if the styling of the conversions are kept in separate files. In an embodiment of the network pages as JavaServer Pages, these network pages are generated by converting the display file records 440 to JavaServer Pages 520 containing DHTML. DHTML is HTML with Cascading Style Sheets and JavaScript used by the client to perform local validation of input fields and facilitates modification after conversion to customize for a user's presentation style. Otherwise, the company's screen design rules may be discovered by analysis of the legacy application's screen definitions or of the display data streams as the screens are viewed. The knowledge base obtained from these analyses can then be modified as needed prior to the conversion process.

The converted user interface pages 520 are dynamically updated at step 530 using existing web page serving technologies on the network server 200 prior to sending the page to the network user agent 570 on the client 300. The application's raw output data are redirected by the data manager 432 of the application runtime operating system 430 at step 540 so that the outbound data for display are not converted to traditional proprietary display data streams as described in FIG. 4, but rather, are sent to a new network publishing component 550, labeled "Publish-to-Web." The network publishing component 550 reformats the application data for publishing to the network because, inter alia, the application data are generated and coded by the legacy application in a format not suitable for display on the network. User input data obtained from the network user agent 570 are also processed by the Publish-to-Web runtime component 550 and reformatted as application input data submitted to the application runtime operating system 430. The network server 200 and a portion of the Publish-to-Web runtime component 550 may be installed on a computer 100 other than the one in which the legacy application 122 and the application runtime 430 are installed but may also be merged with and part of the computer 100 having the legacy application 122. Again, the Publish-to-Web runtime component 550 is engineered so that the legacy application 122 is unaware of any changes in its native environment, thus requiring no code changes to the application.

In a particular embodiment of the Internet and world wide web as the network, JAVA allows JavaServer Pages as the network pages to dynamically insert application data into HTML or XML pages before the network pages are served to a network user agent, a process referred to as dynamically generated web content. The data to be read by the JavaServer Pages are stored in data objects, i.e., JavaBeans, that are populated by a servlet which has received data to publish. A very important feature of the invention is that once the legacy application data has been stored in these data objects in the network server, it becomes available for any purpose, including access from another computer connected to the server, for manipulation, for transmission . . . the uses for this legacy dynamic data on the web server are limitless. The data field definitions of the JavaBeans have a one-to-one mapping with the variable data fields of HTML or XML pages housed by the JavaServer Pages and are generated during the conversion process as Java class definitions because the definition of the proprietary application screens contain the I/O fields of the screens. Such mapping is known in the art, and there are other products such as Active Server Pages that are capable of providing dynamic content from a server to a client. In any embodiment, the servlet instance instantiates and populates these data objects with the redirected dynamic data, usually I/O data, of the legacy application. Preferably, therefore, the data objects have the necessary methods to format the data for display and for converting the data from the application's proprietary code to the network codepage of the appropriate language.

Figure 6:
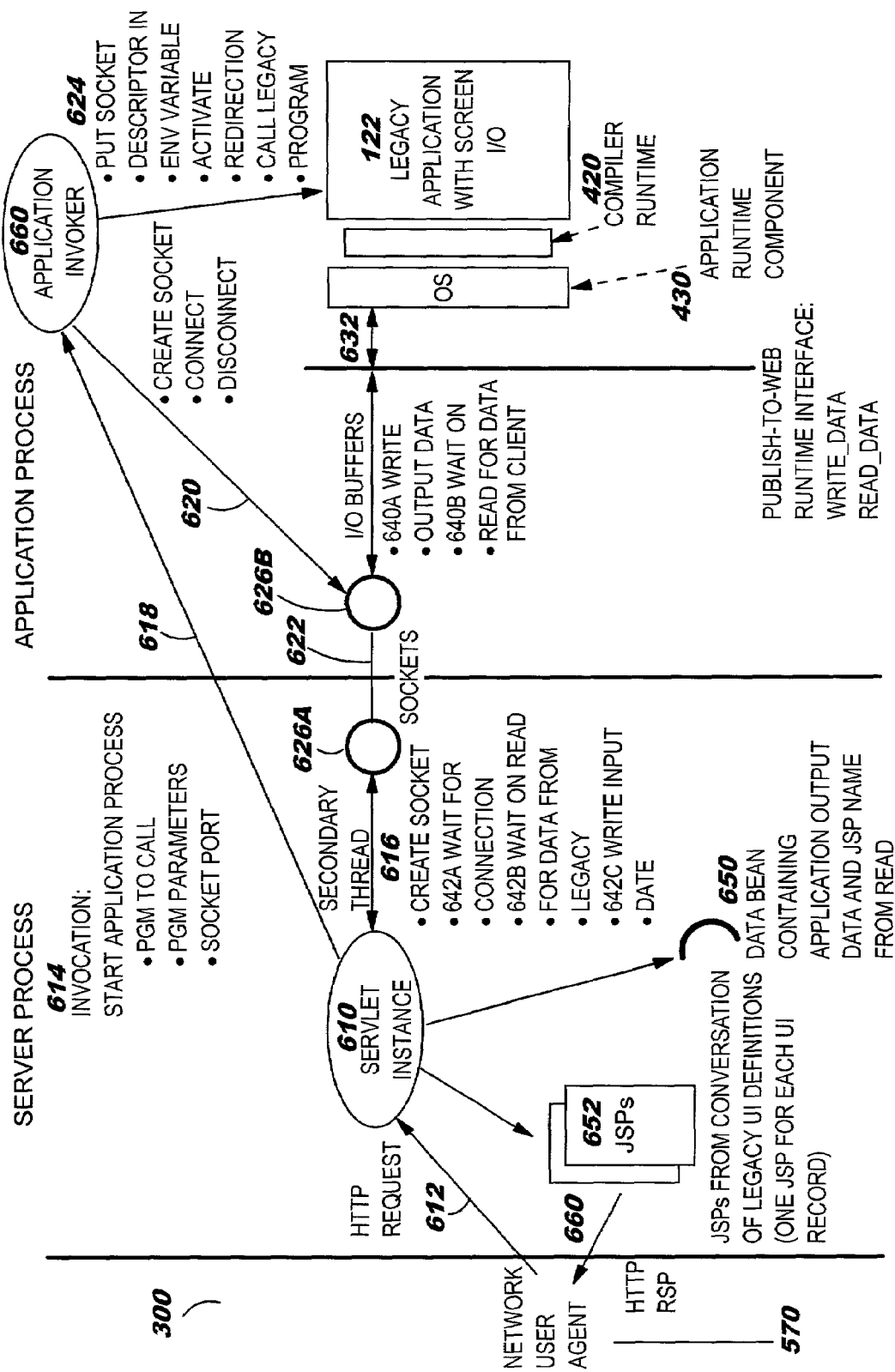
FIG. 6 is a simplified process chart and block diagram of how data can be redirected from a legacy application using world wide web technologies on the Internet.

By way of example only, FIG. 6 illustrates an architecture of the Publish-to-Web runtime component based on the use of JavaServer Pages. The entities of the Publish-to-Web runtime component are: a servlet instance 610 which acts as a web gateway for requests to 612 and replies from 660 a legacy application 122. Generally, a servlet is a JAVA program that runs on a server in response to a client request. For outbound data the servlet instance 610 accepts a data buffer from the socket, looks up the record identifier of the data, instantiates, and populates the associated data object, e.g., the JavaBean, and activate the associated JavaServer Page to serve the data to the network user agent for display. For inbound data, the servlet instance 610 packages the data into a data buffer and submits it to the application via the socket and Publish-to-Web runtime component. The servlet instance 610 also sets up the application process and the communication path between the application process and the network server process. The communication path may include sockets 626 as a communication endpoint. It is to be noted that sockets and other communication endpoints which suspend execution of the application while waiting for input data will inherently preserve the state of the application and will function in the context of the invention. The application invoker 660 saves the socket descriptor to be used later by the Read_Data and Write_Data methods, activates data redirection, and calls the legacy application. The operating system application runtime 430 calls the Read_Data and Write_Data methods to redirect data flow between the application and the Internet. The network user pages, here JavaServer pages, are generated during the user interface conversion process. Data objects, e.g., in this instance JavaBeans, are associated with each of the JavaServer pages and contain application data to publish to the web via the JavaServer pages.

The control flow of the process in accordance with principles of the invention proceeds as follows: a user on a client 300 starts the legacy application 122 from the network user agent 570, preferably a world wide web browser, by first requesting at step 612 an invocation page from the servlet instance 610 on a network server 200. In step 614, the client 300 which may be another computer or a person completes and submits a set of entry fields for the name and parameters of the application to invoke. The servlet instance 610, upon receiving the XML or HTTP request for invocation, at step 616 creates a socket 626a and spawns a secondary thread 618 to the computer 100 launch the application process that invokes the legacy application. The socket 626a then waits for a connection as in step 642a.

The secondary thread 618 passes the socket port number and program information to the application invoker 660 which creates a socket 626b and makes a connection to the socket in the network server process as in step 620. After a connection is established in step 622 between the two sockets 626a and 626b, the socket 626b in the network server process waits for data from the legacy program. The application invoker 660 writes the descriptor of the application-side socket 626b to an environment variable, activates data redirection through an application programming interface and invokes the legacy application 122, as shown in step 624. When the legacy application 122 reaches an I/O instruction, output data is sent as in step 632 to the application runtime component 430 of the computer's operating system which calls the Write_Data method as in 640a to redirect data to the application-side socket 626b. Data is read by the socket 626a in the network server process as in step 642b and the servlet instance 610 creates a data object in step 650 to store the data. In step 652, the servlet instance 610 calls the network page, e.g., the JavaServer Page, associated with this output record. The network page is populated with data from the data object as in step 652 and then served to the network user agent 570 as, e.g., an HTTP response, in step 660.

Subsequent interactions between the client interface on the network user agent 570 and the application 122 flows through the socket connections 626a and 626b. When the client submits a page, the servlet instance 610 on the network server restores session data from a previously saved session object which has a reference to a socket or a data queue object or a message queue object. The input data is then forwarded to socket or queue 626a as in step 642c, to the other application socket or queue 626b and I/O buffers if any and to the application runtime component 430, and eventually to the legacy program 122 that was waiting on a Read_Data method 640b. The legacy application 122 then continues its execution in its native environment on the computer 100 until the next I/O exchange. When the application ends, control returns to the application invoker 660 which closes the endpoint connection as in step 620.

In FIG. 6, a Report Program Generator (RPG) program is used as an example of a legacy application although it is to be understood that the architecture but could also support legacy applications written in COBOL and other programming languages. Sockets are used as the communication mechanism between the distributed processes but any communication endpoint mechanism available to the server, such as data queue objects for enhanced performance if the server and the legacy application are within one computer or the message queue for enhanced reliability and security, may also be used. An initial program in the prestarted job may write the descriptor of the application-side socket to a environment variable, activate the redirection, and invoke the legacy application. When the program hits an I/O instruction, such as a write instruction followed by a read instruction, EXFMT in RPG, output data is sent to a data manager which calls a Publish-to-Web runtime interface, Write_Data, to write to the socket. Data may also be read by the socket 626b using the Publish-to-Web runtime interface Read_Data.

Thus, the invention allows the user to deploy entire business-critical legacy applications to the Internet to take advantage of state-of-the art technology without having to restructure or make code changes to the programs. The legacy application, moreover, executes normally. Legacy application data becomes available across the network for any purpose because it is stored in data objects on the network server. The invention, moreover, allows the user to modify the network pages, such as JavaServer Pages, to create links within the network server to new web based applications. This capability allow interactions between legacy and other network based applications, including merging legacy application data with data from other network applications in the network server. Computer and client systems that allow remote invocation of programs are able to use the architecture described above to run the web server and the legacy applications in separate computer systems. The invention, moreover, allows the user to customize the JavaServer Pages according to the company's rules and guidelines for application presentation. The solution presented herein further allows the I/O data to be converted to other formats that would suit display types other than a browser. One powerful application is the conversion of the I/O data and the display records to a generic XML based user interface. The XML-user interface can then be fed into different types of user interface renderers. These renderers can be Java-Swing based, Voice-Based, PDA Based, etc. The invention, therefore, opens access to existing legacy application from multiple types of future devices.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. A method for accessing a legacy computer application over an Internet, the method comprising:
   converting a proprietary screen definition to a converted user interface page in a pervasive computer Internet user agent format, the converting step further comprising:
   parsing the proprietary screen definition associated with the legacy computer application, wherein the proprietary screen definition is stored separately from the legacy computer application;
   mechanically mapping user interface elements of the proprietary screen definition to an extensible markup language (XML) based language that supports user interface elements;
   customizing the converted user interface page using a customize template that identifies user interface design patterns that reflect a presentation style of a user; and
   validating input fields of the converted user interface page;
   providing access to the legacy computer application responsive to a request from a client that is separate from a computer on which the legacy computer application resides, the client and the computer being connected by a server, the providing step further comprising:
   redirecting a raw output of the legacy computer application to a network publishing component;
   reformatting the raw output for publishing, wherein the reformatted raw output is stored in JavaBean data objects that are populated by a servlet which has received data to publish;
   updating dynamically the convened user interface pages using the reformatted raw output;
   sending the updated converted user interface pages to the client; and
   reformatting input data from the client using the network publishing component to a format of the legacy computer application; and
   making the reformatted raw output in the JavaBean data objects available for access, use and manipulation by another network based application;
   wherein the legacy computer application is not restructured and no code changes are made to programs of the legacy computer application,
   wherein the legacy computer application is non-modular,
   wherein the legacy computer application scamlessly interweaves with the network based application, and
   wherein a state of the legacy computer application is automatically preserved in a native environment after a transaction on the Internet is completed and a connection to the Internet is broken.

* * * * *

UNITED STATES PATENT AND TRADEMARK OFFICE
CERTIFICATE OF CORRECTION

PATENT NO. : 7,007,278 B2
DATED : February 28, 2006
INVENTOR(S) : Gungabeesoon

It is certified that error appears in the above-identified patent and that said Letters Patent is hereby corrected as shown below:

<u>Title page,</u>
*Primary Examiner*, delete "Thompson" and insert -- Thomson --.

<u>Column 12,</u>
Line 46, delete "convened" and insert -- converted --.
Line 60, delete "scamlessly" and insert -- seamlessly --.

Signed and Sealed this

Twenty-third Day of May, 2006

JON W. DUDAS
*Director of the United States Patent and Trademark Office*